United States Patent
Takamatsu et al.

(10) Patent No.: US 12,525,680 B2
(45) Date of Patent: Jan. 13, 2026

(54) NON-AQUEOUS ELECTROLYTE SECONDARY BATTERY AND METHOD FOR MANUFACTURING NON-AQUEOUS ELECTROLYTE SECONDARY BATTERY

(71) Applicant: Panasonic Holdings Corporation, Osaka (JP)

(72) Inventors: Hiroshi Takamatsu, Hyogo (JP); Hiroaki Imanishi, Hyogo (JP); Ichiro Murata, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 708 days.

(21) Appl. No.: 17/780,820

(22) PCT Filed: Nov. 12, 2020

(86) PCT No.: PCT/JP2020/042224
§ 371 (c)(1),
(2) Date: Apr. 19, 2023

(87) PCT Pub. No.: WO2021/117408
PCT Pub. Date: Jun. 17, 2021

(65) Prior Publication Data
US 2023/0261310 A1    Aug. 17, 2023

(30) Foreign Application Priority Data
Dec. 9, 2019    (JP) .................. 2019-222178

(51) Int. Cl.
*H01M 50/342*    (2021.01)
*H01M 10/0587*    (2010.01)
(Continued)

(52) U.S. Cl.
CPC .................. *H01M 50/3425* (2021.01); *H01M 10/0587* (2013.01); *H01M 50/167* (2021.01);
(Continued)

(58) Field of Classification Search
CPC .......... H01M 10/0587; H01M 50/167; H01M 50/186; H01M 50/30; H01M 50/342;
(Continued)

(56) References Cited

U.S. PATENT DOCUMENTS 5,632,129 A    5/1997 Imai et al.
5,665,483 A    9/1997 Saito et al.
(Continued)

FOREIGN PATENT DOCUMENTS

JP    2015-167907 A    9/2015

OTHER PUBLICATIONS

Extended European Search Report dated Jan. 11, 2024 issued in the corresponding European Patent Application No. 20898129.0.
(Continued)

*Primary Examiner* — Lingwen R Zeng
(74) *Attorney, Agent, or Firm* — Rimon P.C.

(57) ABSTRACT

A non-aqueous electrolyte including a battery case which has an opening and a sealing plate sealing the opening includes: a blind rivet fixed to the sealing plate by inserting the blind rivet into an opening portion provided in the sealing plate via a gas permeable membrane. The gas permeable membrane includes a tubular portion and a flange. The blind rivet includes: a sleeve body including a sleeve portion and a flange portion; and a mandrel including a shaft to be inserted into a hollow portion of the sleeve portion and a head. The blind rivet is crimped with the sleeve portion, and fixed to the sealing plate with the sleeve portion and the head being covered with the tubular portion. A space communicating with the outside of the battery case is formed between the gas permeable membrane and the blind rivet.

12 Claims, 8 Drawing Sheets

(51) Int. Cl.
*H01M 50/167* (2021.01)
*H01M 50/186* (2021.01)
*H01M 50/30* (2021.01)
*H01M 50/609* (2021.01)
*H01M 50/627* (2021.01)

(52) U.S. Cl.
CPC ....... *H01M 50/186* (2021.01); *H01M 50/394* (2021.01); *H01M 50/609* (2021.01); *H01M 50/30* (2021.01); *H01M 50/342* (2021.01); *H01M 50/627* (2021.01); *Y02E 60/10* (2013.01)

(58) Field of Classification Search
CPC ........... H01M 50/3425; H01M 50/394; H01M 50/609; H01M 50/627; Y02E 60/10
See application file for complete search history.

(56) References Cited

U.S. PATENT DOCUMENTS

2011/0072648 A1 3/2011 Yamauchi
2015/0325833 A1* 11/2015 Harayama ........... H01M 50/645
429/185

OTHER PUBLICATIONS

International Search Report issued in International Patent Application No. PCT/JP2020/042224, dated Dec. 15, 2020, with English translation.

* cited by examiner

NON-AQUEOUS ELECTROLYTE SECONDARY BATTERY AND METHOD FOR MANUFACTURING NON-AQUEOUS ELECTROLYTE SECONDARY BATTERY

CROSS-REFERENCE OF RELATED APPLICATIONS

This application is the U.S. National Phase under 35 U.S.C. § 371 of International Patent Application No. PCT/JP2020/042224, filed on Nov. 12, 2020, which in turn claims the benefit of Japanese Patent Application No. 2019-222178, filed on Dec. 9, 2019, the entire disclosures of which Applications are incorporated by reference herein.

TECHNICAL FIELD

The present disclosure relates to a non-aqueous electrolyte secondary battery including an internal pressure regulating mechanism, and a method for manufacturing the non-aqueous electrolyte secondary battery.

BACKGROUND ART

A non-aqueous electrolyte secondary battery such as a lithium ion secondary battery contains an organic solvent as an electrolyte. Thus, the electrolyte is decomposed to generate gas during charging and discharging and storing at high temperatures, for example. When the non-aqueous electrolyte secondary battery is used for a long period of time, the pressure inside the battery increases, which may cause expansion of the battery case.

In order to solve such a problem, there has been proposed a secondary battery including a pressure regulating mechanism for regulating the pressure inside the battery by discharging gas generated in the battery to the outside.

As such a pressure regulating mechanism, Patent Document 1 discloses a structure in which a through hole is provided in a lid body 201 of a battery case 200 and a holder 202 holding a gas permeable sheet 204 is detachably attached to the through hole by using a screw or the like, as shown in FIG. 11. A gas flow hole 203 is formed in the holder 202, and the gas generated in the battery permeates the gas permeable sheet 204 and is discharged to the outside through the gas flow hole 203.

CITATION LIST

Patent Document

PATENT DOCUMENT 1: Japanese Unexamined Patent Publication No. 2015-167907

SUMMARY OF THE INVENTION

There is a demand for higher output of batteries mainly for in-vehicle applications. For example, for a lithium ion secondary battery, means for increasing the output involves an increase in the electrode plate area and an increase in the amount of Ni contained in the positive electrode active material. The increase in the electrode plate area reduces the remaining space in the battery case. In addition, the increase in the amount of Ni causes a decrease in cycle characteristics. When an additive is added to substantially prevent the decrease, the amount of the gas increases. As a result, the rate of pressure rise in the battery increases. It is thus necessary to increase the discharge rate of the gas generated in the battery.

In the pressure regulating mechanism disclosed in Patent Document 1, the discharge rate of the gas is controlled by the gas permeability of the gas permeable sheet. Thus, in order to increase the discharge rate of the gas, it is necessary to increase the area or reduce the thickness of the gas permeable sheet.

However, the gas permeable sheet 204 disclosed in Patent Document 1 is attached to an opening end of the gas flow hole 203; thus, the area of the gas permeable sheet 204 cannot be made larger than the opening area of the gas flow hole 203. On the other hand, when the opening area of the gas flow hole 203 is increased, the through hole into which the holder 202 is inserted is also increased. This causes a decrease in the strength of the lid body 201, thereby decreasing the withstand voltage to the battery internal pressure. Therefore, in the pressure regulating mechanism disclosed in Patent Document 1, there is a limit to enlarging of the opening area of the gas flow hole 203 by enlarging the through hole in order to increase the discharge rate of the gas.

In addition, when the gas permeable sheet is made thin, variation in film formation of the gas permeable sheet becomes significant. This increases variation in permeation rate, leading to deterioration in quality of the pressure regulating mechanism. Further, when the gas permeable sheet is made thin, it becomes difficult to hold the gas permeable sheet in the through hole by mechanical means utilizing the elasticity of the sheet such as crimping. In addition, although it is possible to adhesively hold the thin gas permeable sheet in the through hole by using an adhesive such as a double-sided tape, the adhesive is exposed to the organic electrolyte, and thus is not suitable for long-term holding. Further, although a method of welding the gas permeable sheet to the edge of the through hole by heat, ultrasonic waves, or the like can be considered, it is difficult to ensure the strength due to dissimilar material bonding, and it is not suitable for long-term holding.

As described above, there is a problem that the pressure regulating mechanism does not sufficiently function in such a technique, on the battery in which the internal pressure increase rate is increased by increasing the output.

A non-aqueous electrolyte secondary battery according to the present disclosure is a non-aqueous electrolyte battery including a battery case having an opening and a sealing plate sealing the opening. The non-aqueous electrolyte battery includes a blind rivet fixed to the sealing plate by inserting the blind rivet into an opening portion provided in the sealing plate via a gas permeable membrane. The gas permeable membrane includes a tubular portion having a bottomed tubular shape and a flange having an annular shape and formed at an end of the tubular portion. The blind rivet includes: a sleeve body including a sleeve portion having a hollow tubular shape and a flange portion having an annular shape and formed at an end of the sleeve portion; and a mandrel including a shaft to be inserted into a hollow portion of the sleeve portion and a head formed at an end of the shaft and having an outer diameter larger than an inner diameter of the hollow portion.

The blind rivet is inserted into the opening portion, crimped with the sleeve portion, and fixed to the sealing plate with the sleeve portion and the head covered with a tubular portion of the gas permeable membrane, and a space communicating with the outside of the battery case is formed between the gas permeable membrane and the blind rivet with the blind rivet fixed to the sealing plate.

A non-aqueous electrolyte secondary battery manufacturing method according to the present embodiment is a method of manufacturing a non-aqueous electrolyte secondary battery including a battery case having an opening and a sealing plate sealing the opening. The method includes: a step (A) of inserting a blind rivet into an opening portion provided in the sealing plate via a gas permeable membrane; and a step (B) of crimping the blind rivet to fix the blind rivet to the sealing plate.

The blind rivet includes: a sleeve body including a sleeve portion having a hollow tubular shape and a flange portion having an annular shape and formed at an end of the sleeve portion; and a mandrel including a shaft inserted into a hollow portion of the sleeve portion and a head formed at an end of the shaft and having an outer diameter larger than an inner diameter of the hollow portion. The gas permeable membrane includes a tubular portion having a bottomed tubular shape and a flange having an annular shape and formed at an end of the tubular portion.

In the step (A), the blind rivet is inserted into the opening portion with the sleeve portion and the head covered with the tubular portion of the gas permeable membrane. The step (B) is performed by pulling the mandrel up from the sleeve portion while pressing the flange portion against the sealing plate. As a result, the outer diameter of the sleeve portion becomes larger than the inner diameter of the opening portion, and the blind rivet is fixed to the sealing plate. In the step (B), with the blind rivet fixed to the sealing plate, the space communicating with the outside of the battery case is formed between the gas permeable membrane and the blind rivet.

According to the present disclosure, it is possible to provide a non-aqueous electrolyte secondary battery including a pressure regulating mechanism having a high gas discharge capability, and a method for manufacturing the non-aqueous electrolyte secondary battery.

DESCRIPTION OF EMBODIMENTS

Embodiments of the present invention will be described in detail below with reference to the drawings. Note that the present invention is not limited to the following embodiments. Modifications may be made as appropriate without departing from the scope of the advantages of the present invention.

First Embodiment

Figure 1:
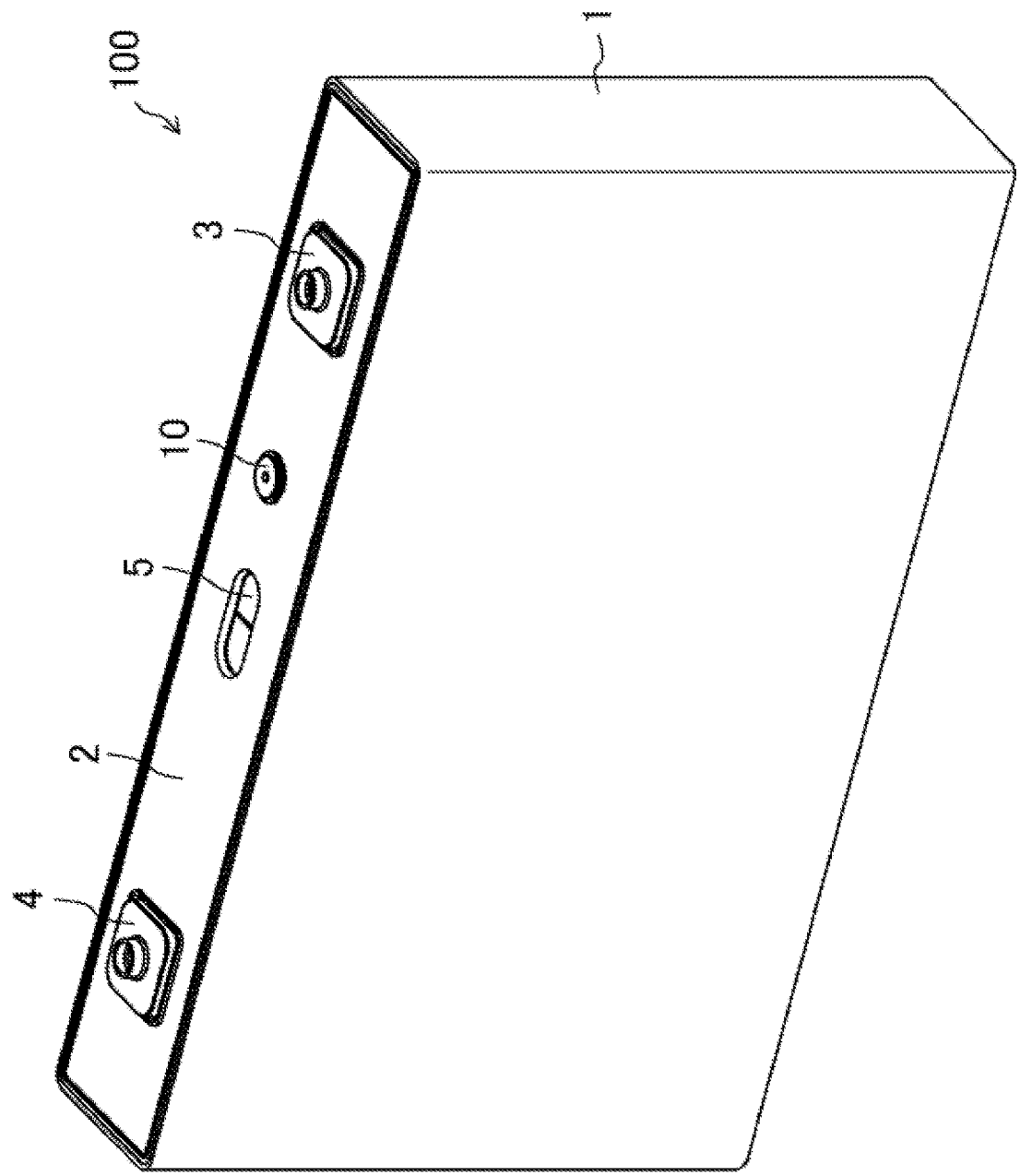
FIG. 1 is a schematic perspective view of a non-aqueous electrolyte secondary battery according to a first embodiment of the present disclosure.

FIG. 1 is a schematic perspective view of a non-aqueous electrolyte secondary battery according to a first embodiment of the present disclosure. The non-aqueous electrolyte secondary battery according to the present embodiment is a battery in which a "non-aqueous system" such as an organic electrolyte or an organic solvent is used as an electrolyte, and the type thereof is not particularly limited. A typical example of the non-aqueous electrolyte secondary battery is a lithium ion secondary battery.

As shown in FIG. 1, in a non-aqueous electrolyte secondary battery 100, a battery case 1 accommodates an electrode body, and an opening of the battery case 1 is sealed with a sealing plate 2. The electrode body has a structure where a positive electrode and a negative electrode are wound or stacked via a separator. The positive electrode, the negative electrode, and the separator used may be commonly used ones.

A positive electrode external terminal 3, a negative electrode external terminal 4, an explosion proof valve 5, and a blind rivet 10 are fixed to the sealing plate 2. The positive electrode external terminal 3 and the negative electrode external terminal 4 are connected to the positive electrode and the negative electrode of the electrode body, respectively. The explosion proof valve 5 releases gas in the battery when the pressure in the battery case rises to a predetermined value or more. The blind rivet 10 is inserted into and fixed to a liquid injection hole (opening portion) provided in the sealing plate 2.

Figure 2:
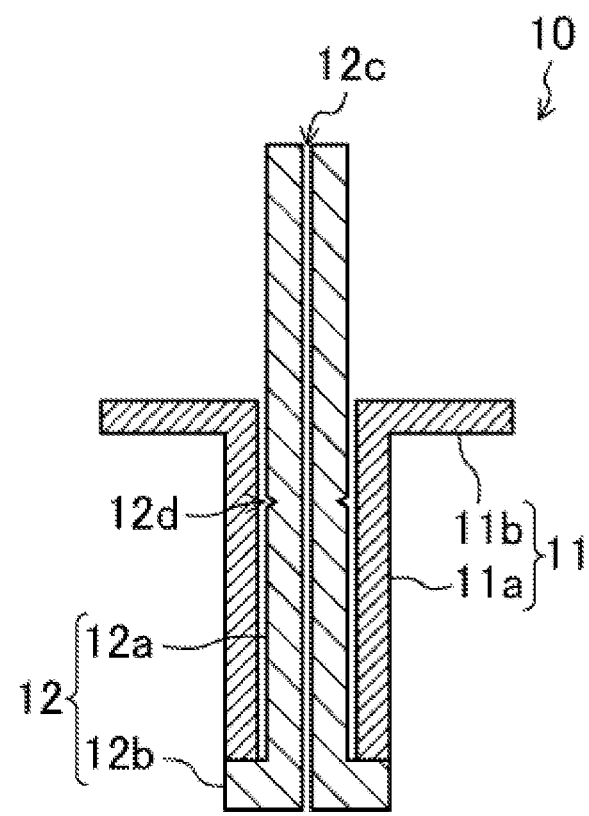
FIG. 2 is a schematic cross-sectional view of the configuration of a blind rivet used in the first embodiment.

FIG. 2 is a schematic cross-sectional view of the configuration of the blind rivet 10 used in the present embodiment.

As shown in FIG. 2, the blind rivet 10 includes a sleeve body 11 and a mandrel 12. The sleeve body 11 includes a sleeve portion 11a having a hollow tubular shape and a flange portion 11b having an annular shape and formed at an end of the sleeve portion 11a. The mandrel 12 includes a shaft 12a inserted into the hollow portion of the sleeve portion 11a, and a head 12b formed at an end of the shaft 12a and having an outer diameter larger than the inner diameter of the hollow portion of the sleeve portion 11a. The mandrel 12 has a through hole 12c penetrating in the axial direction, and a notch 12d is formed on an outer peripheral portion of the shaft 12a.

Figure 3:
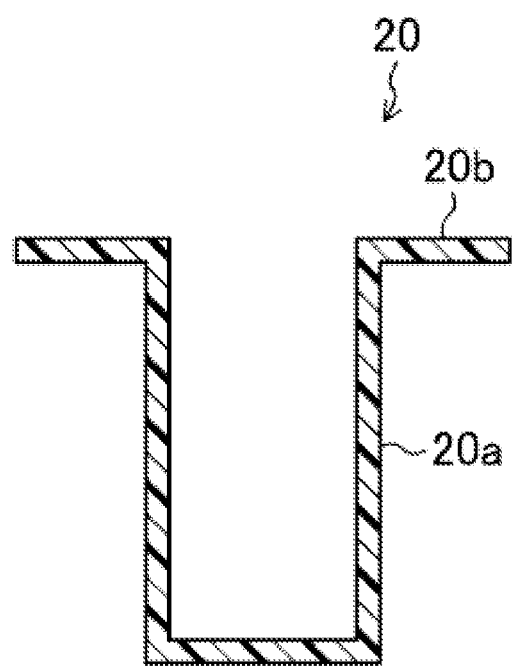
FIG. 3 is a schematic cross-sectional view of the configuration of a gas permeable membrane used in the first embodiment.

FIG. 3 is a schematic cross-sectional view of the configuration of a gas permeable membrane 20 used in the present embodiment.

As shown in FIG. 3, the gas permeable membrane 20 includes a tubular portion 20a having a bottomed tubular shape and a flange 20b having an annular shape and formed at an end of the tubular portion 20a. The gas permeable membrane 20 is formed of a selective permeable membrane that allows gas generated in the battery case 1 to selectively permeate therethrough. For example, for the lithium ion secondary battery, examples of the gas generated in the battery case 1 include gases such as hydrogen, carbon dioxide, and oxygen. In addition, for the lithium ion secondary battery, it is preferable to use the gas permeable membrane 20 that does not allow moisture to permeate.

The material of the gas permeable membrane 20 is not particularly limited. For example, a fluorine resin typified by polytetrafluoroethylene (PTFE) has high heat resistance, chemical resistance, gas permeability, and moisture permeation prevention, and thus is preferable as the material of the gas permeable membrane 20 for the lithium ion secondary battery. In addition, perfluoroalkoxy fluorine resin (PFA) or a tetrafluoroethylene-hexafluoropropylene copolymer (FEP) can be formed by injection molding. It is thus possible to obtain the gas permeable membrane 20 having a stable shape.

FIGS. 4A to 4D are cross-sectional views showing a non-aqueous electrolyte secondary battery manufacturing method according to the present embodiment.

First, an electrode body is accommodated in a battery case 1, and an opening of the battery case 1 is then sealed with a sealing plate 2. A positive electrode external terminal 3 and a negative electrode external terminal 4 are fixed to the sealing plate 2 in advance. Thereafter, an electrolyte is injected into the battery case 1 through a liquid injection hole provided in the sealing plate 2.

Figure 4:
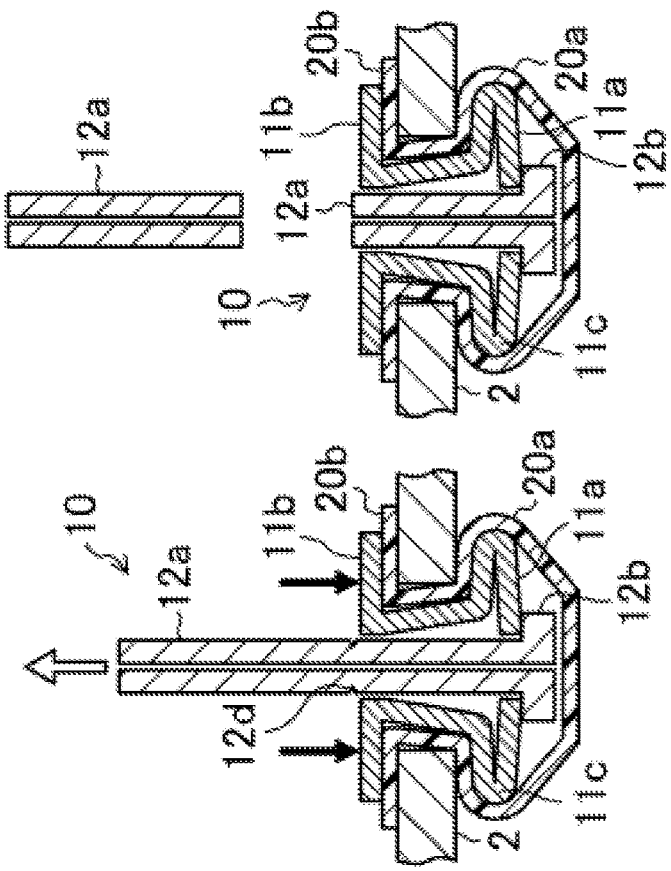
FIGS. 4A to 4D are cross-sectional views showing a method of manufacturing a non-aqueous electrolyte secondary battery according to the first embodiment.

Next, as shown in FIG. 4A, a blind rivet 10 shown in FIG. 2 is inserted into the liquid injection hole (opening portion) 6 provided in the sealing plate 2 via a gas permeable membrane 20 shown in FIG. 3. Specifically, the blind rivet 10 is inserted into the liquid injection hole 6 with a sleeve portion 11*a* of a sleeve body 11 and a head 12*b* of a mandrel 12 covered with a tubular portion 20*a* of the gas permeable membrane 20.

FIG. 4B shows a state in which the blind rivet 10 is inserted into the liquid injection hole 6. A flange portion 11*b* of the sleeve body 11 is in contact with the upper surface of the sealing plate 2 via the flange 20*b* of the gas permeable membrane 20.

Next, as shown in FIG. 4C, the blind rivet 10 is crimped to fix the blind rivet 10 to the sealing plate 2. Specifically, crimping of the blind rivet 10 is performed by pulling the mandrel 12 up from the sleeve portion 11*a* while pressing the flange portion 11*b* against the sealing plate 2.

At this time, the head 12*b* of the mandrel 12 is pulled up while deforming the sleeve portion 11*a*. As a result, the outer diameter of the sleeve portion 11*a* becomes larger than the inner diameter of the liquid injection hole 6, and an extended portion 11*c* is pressed against the sealing plate 2. Accordingly, the blind rivet 10 is fixed to the sealing plate 2.

In addition, when the outer diameter of the sleeve portion 11*a* is extended, the outer diameter of the tubular portion 20*a* of the gas permeable membrane 20 is also extended. As a result, the gas permeable membrane 20 is fixed to the sealing plate 2 while being sandwiched between an extended portion 11*c* of the sleeve portion 11*a* and the sealing plate 2.

When the mandrel 12 is further pulled up, as shown in FIG. 4D, the shaft 12*a* is broken at the position where the notch 12*d* is formed, and the remaining portion remains in the sleeve portion 11*a*.

Figure 5:
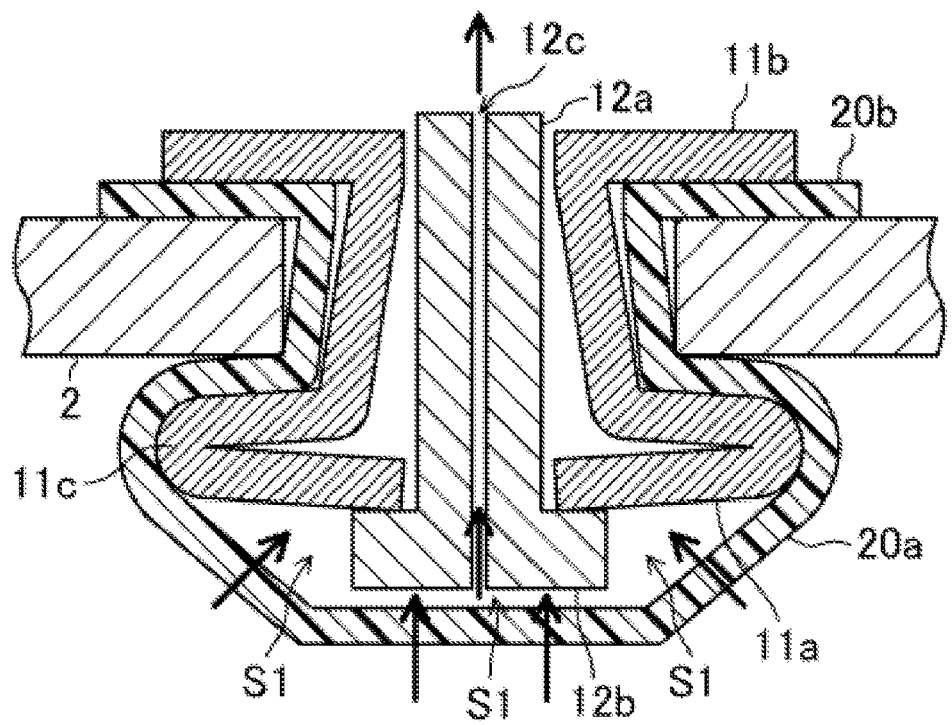
FIG. 5 is an enlarged view showing a state in which the blind rivet is fixed to the sealing plate.

FIG. 5 is an enlarged view showing a state in which the blind rivet 10 is fixed to the sealing plate 2.

As shown in FIG. 5, with the blind rivet 10 fixed to the sealing plate 2, a space S1 is formed between the gas permeable membrane 20 and the blind rivet 10. The space S1 communicates with the outside of the battery case 1 via a through hole 12*c* provided in the mandrel 12. Thus, the gas generated in the battery case 1 passes through the gas permeable membrane 20, enters the space S1, passes through the through hole 12*c*, and is discharged to the outside of the battery case 1.

In the present embodiment, the gas permeable membrane 20 has a tubular portion 20*a* having an extended outer diameter. Thus, the area of the gas permeable membrane 20 facing the space S1 is large. As a result, it is possible to increase the discharge rate of the gas which permeates through the gas permeable membrane 20 and is discharged to the outside of the battery case 1. Accordingly, it is possible to realize a non-aqueous electrolyte secondary battery including a pressure regulating mechanism having a high gas discharge capability. In particular, it is possible to make the pressure regulating mechanism sufficiently function even on a battery in which the output is increased and the internal pressure increase rate is increased.

The pressure regulating mechanism in the present embodiment can be formed only by inserting the blind rivet 10 covered with the gas permeable membrane 20 into the liquid injection hole 6 and then crimping the blind rivet 10 to fix it to the sealing plate 2. This can realize a pressure regulating mechanism having a high gas discharge capability with a simple configuration.

Even if the through hole 12*c* provided in the mandrel 12 has a minute diameter (e.g., a diameter of 0.1 mm or less), the through hole 12*c* has a sufficient gas discharge capability with respect to the gas generated in the battery case 1. Therefore, it is not necessary to increase the diameter of the through hole 12*c*, thus, it is not necessary to increase the outer diameter of the blind rivet 10. Therefore, it is not necessary to increase the diameter of the liquid injection hole 6 into which the blind rivet 10 is inserted, and the strength of the sealing plate 2 does not decrease.

Further, in the present embodiment, the blind rivet 10 is crimped to fix it to the sealing plate 2. Thus, when the blind rivet 10 is inserted into the liquid injection hole 6, foreign matters generated by friction or the like do not enter the battery case.

As described above, a non-aqueous electrolyte secondary battery 100 according to the present disclosure is a non-aqueous electrolyte battery including a battery case 1 having an opening and a sealing plate 2 sealing the opening. The non-aqueous electrolyte secondary battery 100 includes a blind rivet 10 fixed to the sealing plate 2 by inserting the blind rivet 10 into a liquid injection hole (opening portion) 6 provided in the sealing plate 2 via the gas permeable membrane 20.

The gas permeable membrane 20 includes a tubular portion 20*a* having a bottomed tubular shape and a flange 20*b* having an annular shape and formed at an end of the tubular portion 20*a*. The blind rivet 10 includes: a sleeve body 11 including a sleeve portion 11*a* having a hollow tubular shape and a flange portion 11*b* having an annular shape and formed at an end of the sleeve portion 11*a*; and a mandrel 12 including a shaft 12*a* to be inserted into a hollow portion of the sleeve portion 11*a* and a head 12*b* formed at an end of the shaft 12*a* and having the outer diameter larger than the inner diameter of the hollow portion.

The blind rivet 10 is inserted into the liquid injection hole (opening portion) 6, crimped with the sleeve portion 11*a*, and fixed to the sealing plate 2 with the sleeve portion 11*a* and the head 12*b* covered with the tubular portion 20*a* of the gas permeable membrane 20, and with the blind rivet 10 fixed to the sealing plate 2, the space S1 communicating with the outside of the battery case 1 is formed between the gas permeable membrane 20 and the blind rivet 10.

The non-aqueous electrolyte secondary battery manufacturing method according to the present embodiment includes: the step (A) of inserting a blind rivet 10 into a liquid injection hole (opening portion) 6 provided in a sealing plate 2 via a gas permeable membrane 20; and the step (B) of crimping the blind rivet 10 to fix the blind rivet 10 to the sealing plate 2.

In the step (A), the blind rivet 10 is inserted into the liquid injection hole (opening portion) 6 with the sleeve portion 11a and the head 12b covered with the tubular portion 20a of the gas permeable membrane 20.

The step (B) is performed by pulling the mandrel 12 up from the sleeve portion 11a while pressing the flange portion 11b against the sealing plate 2. As a result, the outer diameter of the sleeve portion 11a becomes larger than the inner diameter of the liquid injection hole (opening portion) 6, and the blind rivet 10 is fixed to the sealing plate 2.

In the step (B), with the blind rivet 10 fixed to the sealing plate 2, the space S1 communicating with the outside of the battery case 1 is formed between the gas permeable membrane 20 and the blind rivet 10.

(Variation)

In the above-described embodiment, as shown in FIG. 5, the gas entering the space S1 formed between the gas permeable membrane 20 and the blind rivet 10 is discharged to the outside via the through hole 12c provided in the mandrel 12.

Figure 6:
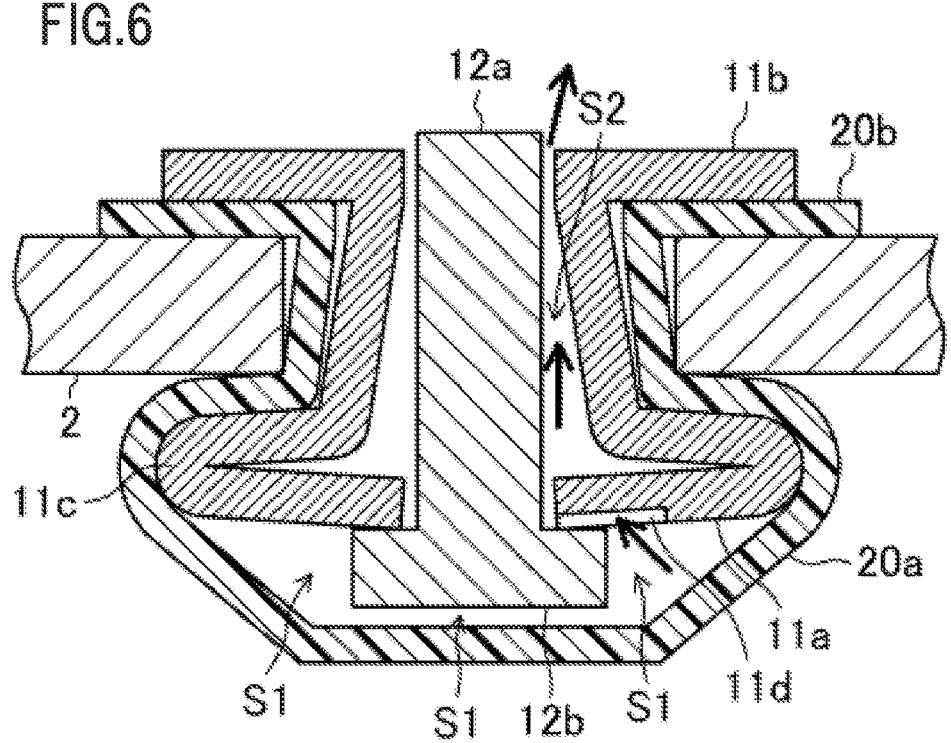
FIG. 6 is a view of the configuration of another ventilation path for discharging gas entering the space S1 to the outside.

FIG. 6 is a view of the configuration of another ventilation path for discharging gas entering the space S1 to the outside without providing the through hole 12c.

As shown in FIG. 6, in the present variation, a vertical groove 11d is formed on the outer periphery of the distal end portion of the sleeve portion 11a. A space S2 opened to the outside is formed between the sleeve portion 11a and the shaft 12a of the mandrel 12. Therefore, the space S1 can communicate with the space S2 via the vertical groove 11d. Accordingly, the gas entering the space S1 can be discharged to the outside through the vertical groove 11d and the space S2 as a ventilation path.

Figure 7:
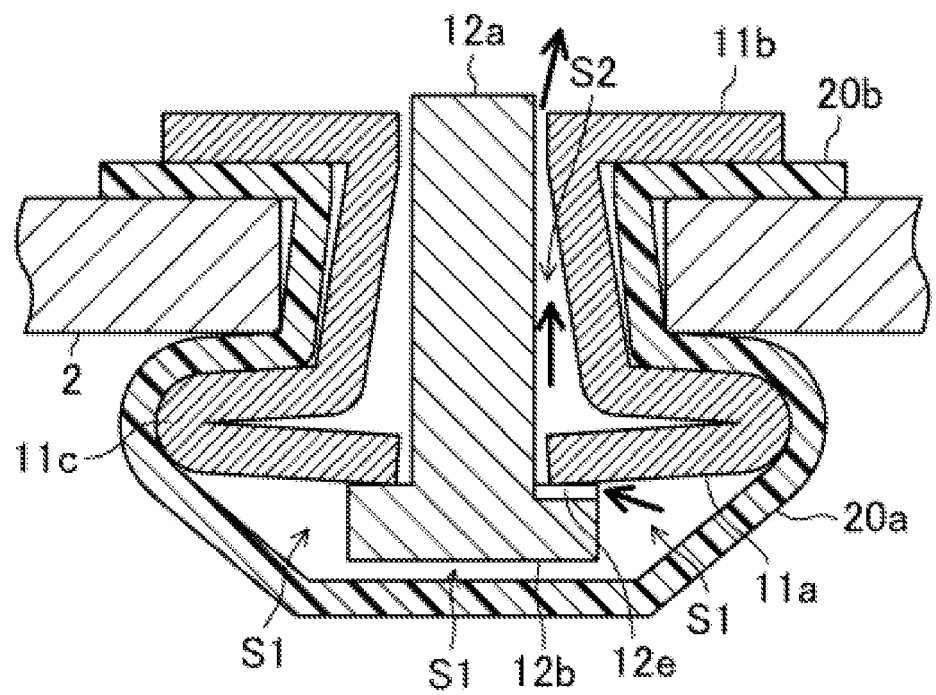
FIG. 7 is a view of the configuration of another ventilation path for discharging gas entering the space S1 to the outside.

Further, as shown in FIG. 7, a lateral groove 12e may be formed in the head 12b of the mandrel 12. Also in this case, the space S1 can communicate with the space S2 via the lateral groove 12e. Thus, the gas entering the space S1 can be discharged to the outside through the lateral groove 12e and the space S2 as a ventilation path.

Second Embodiment

Figure 8:
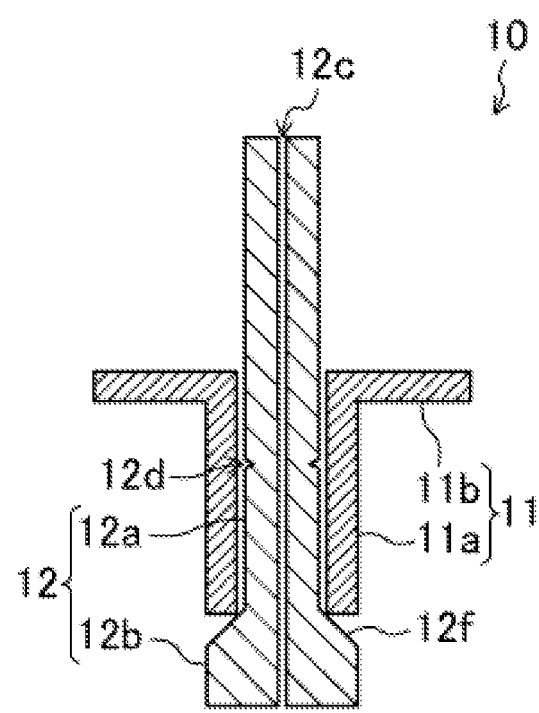
FIG. 8 is a schematic cross-sectional view of the configuration of a blind rivet according to a second embodiment of the present disclosure.

FIG. 8 is a schematic cross-sectional view of the configuration of a blind rivet according to a second embodiment of the present disclosure.

As shown in FIG. 8, a blind rivet 10 according to the present embodiment includes a sleeve body 11 and a mandrel 12. The sleeve body 11 includes a sleeve portion 11a having a hollow tubular shape and a flange portion 11b having an annular shape and formed at an end of the sleeve portion 11a. The mandrel 12 includes a shaft 12a inserted into the hollow portion of the sleeve portion 11a, and a head 12b formed at an end of the shaft 12a and having an outer diameter larger than the inner diameter of the hollow portion of the sleeve portion 11a Further, the mandrel 12 has a through hole 12c penetrating in the axial direction. Further, a notch 12d is formed on an outer peripheral portion of the shaft 12a.

The present embodiment is different in structure from the first embodiment (FIG. 5) in that the head 12b has an inclined surface 12f near the end of the sleeve portion 11a.

FIGS. 9A to 9D are cross-sectional views showing the non-aqueous electrolyte secondary battery manufacturing method according to the present embodiment.

Figure 9:
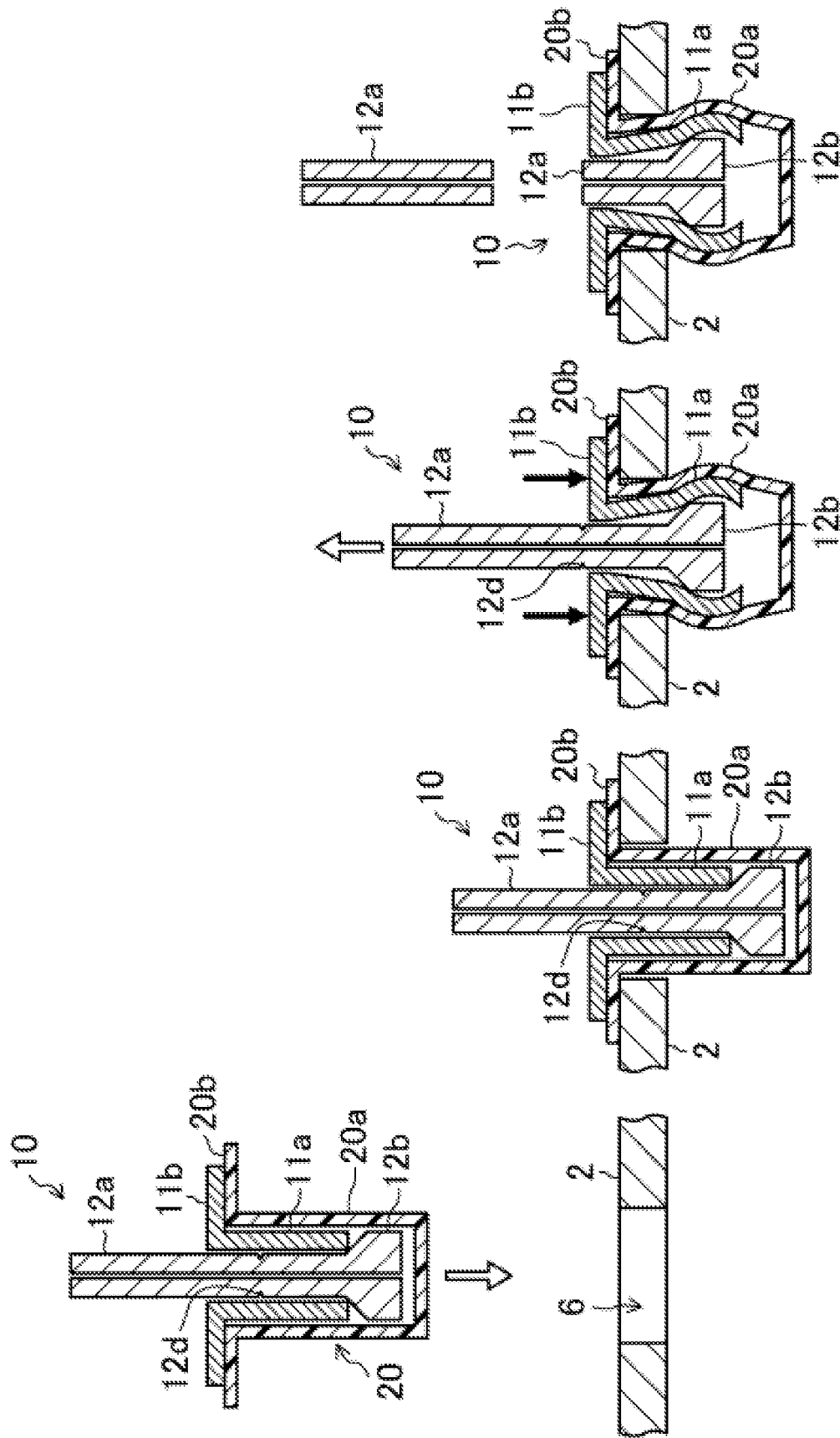
FIGS. 9A to 9D are cross-sectional views showing a method of manufacturing the non-aqueous electrolyte secondary battery in the second embodiment.

As shown in FIG. 9A, a blind rivet 10 shown in FIG. 8 is inserted into the liquid injection hole (opening portion) 6 provided in the sealing plate 2 via a gas permeable membrane 20 shown in FIG. 3. Specifically, the blind rivet 10 is inserted into the liquid injection hole 6 with a sleeve portion 11a of a sleeve body 11 and a head 12b of a mandrel 12 covered with a tubular portion 20a of the gas permeable membrane 20.

FIG. 9B shows a state in which the blind rivet 10 is inserted into the liquid injection hole 6. A flange portion 11b of the sleeve body 11 is in contact with the upper surface of the sealing plate 2 via the flange 20b of the gas permeable membrane 20.

Next, as shown in FIG. 9C, the blind rivet 10 is crimped to fix it to the sealing plate 2. Specifically, crimping of the blind rivet 10 is performed by pulling the mandrel 12 up from the sleeve portion 11a while pressing the flange portion 11b against the sealing plate 2.

At this time, the head 12b of the mandrel 12 is pulled up while deforming the sleeve portion 11a. As a result, the outer diameter of the sleeve portion 11a becomes larger than the inner diameter of the liquid injection hole 6, and an extended portion is pressed against the sealing plate 2. Accordingly, the blind rivet 10 is fixed to the sealing plate 2.

As shown in FIG. 4C, in the first embodiment, the sleeve portion 11a is extended while being folded, but in the present embodiment, the sleeve portion 11a is extended while being deformed into an arc shape.

When the outer diameter of the sleeve portion 11a is extended, the outer diameter of the tubular portion 20a of the gas permeable membrane 20 is also extended. As a result, the gas permeable membrane 20 is fixed to the sealing plate 2 while being sandwiched between an extended portion 11c of the sleeve portion 11a and the sealing plate 2.

When the mandrel 12 is further pulled up, as shown in FIG. 9D, the shaft 12a is broken at the position where the notch 12d is formed, and the remaining portion remains in the sleeve portion 11a.

Figure 10:
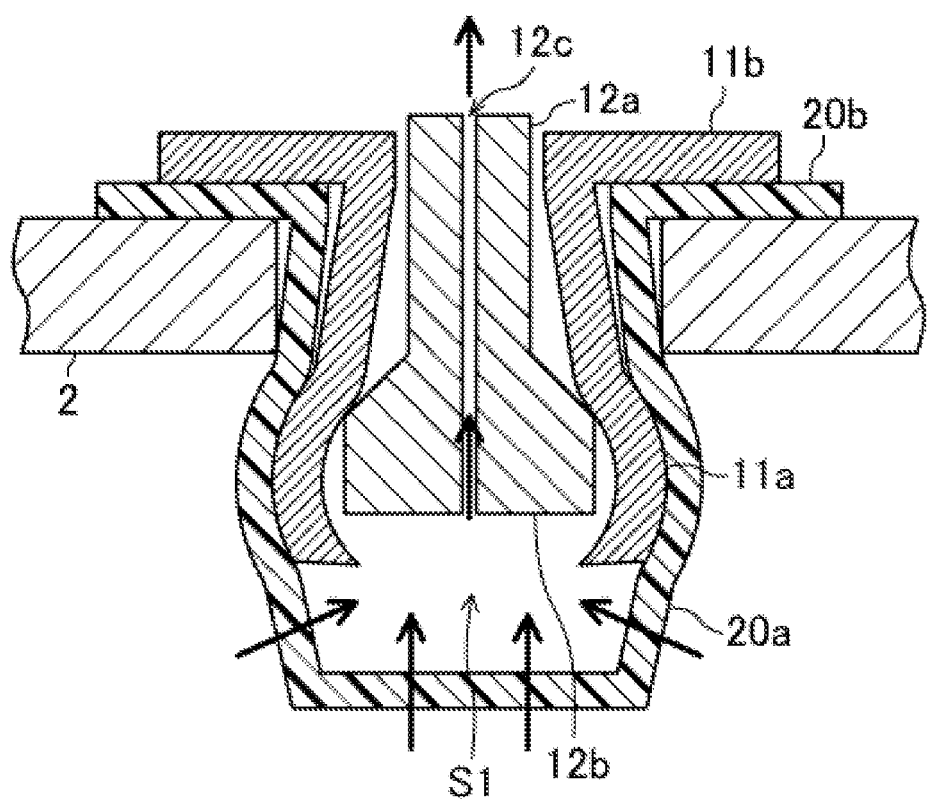
FIG. 10 is an enlarged view showing a state in which the blind rivet is fixed to the sealing plate.
Figure 11:
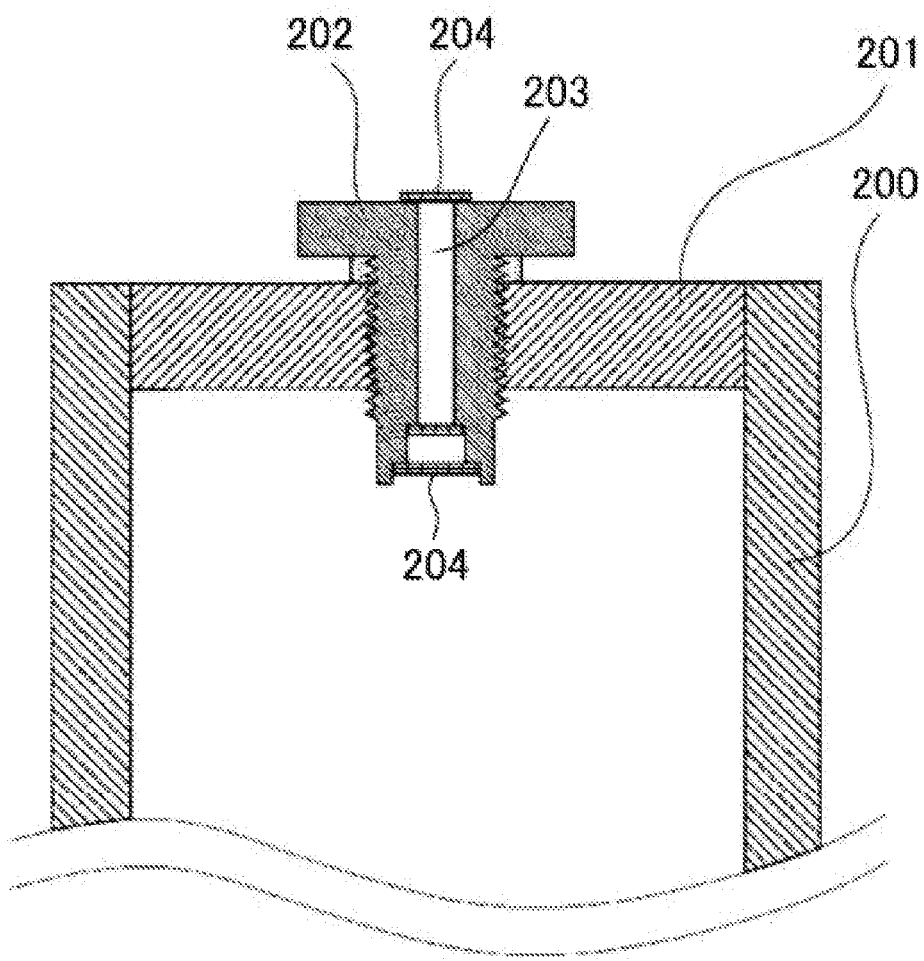
FIG. 11 is a cross-sectional view of the configuration of a typical pressure regulating mechanism.

FIG. 10 is an enlarged view showing a state in which the blind rivet 10 is fixed to the sealing plate 2.

As shown in FIG. 10, with the blind rivet 10 fixed to the sealing plate 2, a space S1 is formed between the gas permeable membrane 20 and the blind rivet 10. The space S1 communicates with the outside of the battery case 1 via a through hole 12c provided in the mandrel 12. Thus, the gas generated in the battery case 1 passes through the gas permeable membrane 20, enters the space S1, passes through the through hole 12c, and is discharged to the outside of the battery case 1.

In the present embodiment, the gas permeable membrane 20 has a tubular portion 20a having an extended outer diameter. Thus, the area of the gas permeable membrane 20 facing the space S1 is large. Accordingly, it is possible to increase the discharge rate of the gas which permeates through the gas permeable membrane 20 and is discharged to the outside of the battery case 1. As a result, it is possible to provide a non-aqueous electrolyte secondary battery including a pressure regulating mechanism having a high gas discharge capability. In particular, it is possible to make the pressure regulating mechanism sufficiently function even on a battery in which the output is increased and the internal pressure increase rate is increased.

Further, in the present embodiment, the sleeve portion 11a is not folded. It is thus possible to shorten the sleeve portion 11a before crimping as compared with the first embodiment.

Also in this embodiment, instead of providing the through hole 12c in the mandrel 12, a groove is formed in the inner periphery of the sleeve portion 11a or the inclined surface 12f in the head 12b of the mandrel 12 as shown in FIG. 6 or 7, so that the gas entering the space S1 can be discharged to the outside.

While the present invention has been described with reference to a preferred embodiment, such description is not limiting, and various modifications may be made.

For example, in the above-described embodiment, as the deformation of the sleeve portion 11a when the mandrel 12 is pulled up from the sleeve portion 11a, the case where the sleeve portion 11a is folded and deformed (FIG. 4C) and the case where the sleeve portion 11a is deformed in an arc shape (FIG. 9C) are exemplified. However, the deformation is not limited to these, and may be any deformation as long as the outer diameter of the sleeve portion 11a is larger than the inner diameter of the liquid injection hole 6.

In the above-described embodiment, the blind rivet is inserted into the liquid injection hole 6 and fixed to the sealing plate 2. However, the blind rivet may be inserted into an opening portion provided in the sealing plate 2 separately from the liquid injection hole 6 and fixed to the sealing plate 2.

Further, in the above-described embodiment, as shown in FIG. 4A, the blind rivet 10 is inserted into the liquid injection hole 6 with the blind rivet 10 covered with the gas permeable membrane 20, but the blind rivet 10 may be inserted into the tubular portion 20a of the gas permeable membrane 20 after the gas permeable membrane 20 is inserted into the liquid injection hole 6.

In the above embodiment, the materials of the sleeve body 11 and the mandrel 12 constituting the blind rivet 10 are not particularly limited.

DESCRIPTION OF REFERENCE CHARACTERS

1 Battery Case
2 Sealing Plate
3 Positive Electrode External Terminal
4 Negative Electrode External Terminal
5 Explosion Proof Valve
6 Liquid Injection Hole (Opening Portion)
10 Blind Rivet
11 Sleeve Body
11a Sleeve Portion
11b Flange Portion
11c Extended Portion
11d Vertical Groove
12 Mandrel
12a Shaft
12b Head
12c Through Hole
12d Notch
12e Lateral Groove
12f Inclined Surface
20 Gas Permeable Membrane
20a Tubular Portion
20b Flange
100 Non-Aqueous Electrolyte Secondary Battery
S1, S2 Space

The invention claimed is:

1. A non-aqueous electrolyte secondary battery including: a battery case having an opening; and a sealing plate sealing the opening, the non-aqueous electrolyte secondary battery comprising:
a blind rivet fixed to the sealing plate by inserting the blind rivet into an opening portion provided in the sealing plate via a gas permeable membrane, wherein
the gas permeable membrane includes a tubular portion having a bottomed tubular shape and a flange having an annular shape and formed at an end of the tubular portion,
the blind rivet comprises:
a sleeve body including a sleeve portion having a hollow tubular shape and a flange portion having an annular shape and formed at an end of the sleeve portion, and
a mandrel including a shaft inserted into a hollow portion of the sleeve portion and a head formed at an end of the shaft and having an outer diameter larger than an inner diameter of the hollow portion,
the blind rivet is inserted into the opening portion, crimped with the sleeve portion, and fixed to the sealing plate with the sleeve portion and the head covered with a tubular portion of the gas permeable membrane, and
a space communicating with outside of the battery case is formed between the gas permeable membrane and the blind rivet with the blind rivet fixed to the sealing plate.

2. The non-aqueous electrolyte secondary battery of claim 1, wherein
the mandrel has a through hole penetrating in an axial direction,
the space formed between the gas permeable membrane and the blind rivet communicates with outside of the battery case via the through hole.

3. The non-aqueous electrolyte secondary battery of claim 1, wherein the tubular portion of the gas permeable membrane is fixed to the sealing plate while being sandwiched between an extended portion of the sleeve portion and the sealing plate.

4. The non-aqueous electrolyte secondary battery according to claim 1, wherein the gas permeable membrane is a selective permeable membrane that selectively allows gas generated in the battery case to permeate therethrough.

5. The non-aqueous electrolyte secondary battery according to claim 4, wherein the gas permeable membrane is made of a fluorine resin formed by injection molding.

6. The non-aqueous electrolyte secondary battery according to claim 1, wherein the opening portion includes a liquid injection hole through which an electrolyte is injected.

7. A method of manufacturing a non-aqueous electrolyte secondary battery including a battery case having an opening and a sealing plate sealing the opening, the method comprising:
a step (A) of inserting a blind rivet into an opening portion provided in the sealing plate via a gas permeable membrane; and
a step (B) of crimping the blind rivet to fix the blind rivet to the sealing plate, wherein
the blind rivet comprises:
a sleeve body including a sleeve portion having a hollow tubular shape and a flange portion having an annular shape and formed at an end of the sleeve portion, and
a mandrel including a shaft inserted into a hollow portion of the sleeve portion and a head formed at an end of the shaft and having an outer diameter larger than an inner diameter of the hollow portion, the gas permeable membrane includes a tubular portion having a bottomed tubular shape and a flange having an annular shape and formed at an end of the tubular portion, in the step (A), the blind rivet is inserted into the opening portion with the sleeve portion and the head covered with the tubular portion of the gas permeable membrane, and the step (B) is performed by pulling the mandrel up from the sleeve portion while pressing the flange portion against the sealing plate, whereby the outer diameter of the sleeve portion becomes larger than the inner diameter of the opening portion, and the blind rivet is fixed to the sealing plate, and in the step (B), a space communicating with outside of the battery case is formed between the gas permeable membrane and the blind rivet with the blind rivet fixed to the sealing plate.

8. The method of claim 7, wherein the mandrel has a through hole penetrating in an axial direction, in the step (B), the space formed between the gas permeable membrane and the blind rivet communicates with outside of the battery case via the through hole.

9. The method of claim 7, wherein in the step (B), the tubular portion of the gas permeable membrane is fixed to the sealing plate while being sandwiched between an extended portion of the sleeve portion and the sealing plate.

10. The method of claim 7, wherein the gas permeable membrane is a selective permeable membrane that selectively allows gas generated in the battery case to permeate therethrough.

11. The method of claim 10, wherein the gas permeable membrane is made of a fluorine resin formed by injection molding.

12. The method of claim 7, wherein the opening portion provided in the sealing plate includes a liquid injection hole through which an electrolyte is injected, and the step (A) is performed after injecting the electrolyte from the liquid injection hole to the battery case.

* * * * *